US012400505B1

(12) United States Patent
Sandhu

(10) Patent No.: US 12,400,505 B1
(45) Date of Patent: Aug. 26, 2025

(54) ACCESS CONTROL MESH NETWORK

(71) Applicant: Amazon Technologies, Inc., Seattle, WA (US)

(72) Inventor: Harminder Singh Sandhu, Northville, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 246 days.

(21) Appl. No.: 18/122,014

(22) Filed: Mar. 15, 2023

(51) Int. Cl.
*G07C 9/27* (2020.01)

(52) U.S. Cl.
CPC .................................... *G07C 9/27* (2020.01)

(58) Field of Classification Search
CPC ................ G07C 9/27; G06F 3/00; G06F 5/00
USPC .......................................................... 340/5.6
See application file for complete search history.

(56) References Cited

U.S. PATENT DOCUMENTS 7,835,331 B2 * 11/2010 Dickerson .............. H04L 67/75 714/33
8,458,369 B2 * 6/2013 Liao ...................... G06F 13/387 710/36
9,699,815 B2 * 7/2017 Law ...................... H04W 40/14
10,750,433 B1 * 8/2020 Shukla .................. H04W 48/10
11,038,754 B2 * 6/2021 Eryigit .............. H04W 28/0205
11,102,642 B1 * 8/2021 Lembke .................. H04W 8/24
2006/0039371 A1 * 2/2006 Castro ..................... H04L 12/42 370/395.2
2008/0170550 A1 * 7/2008 Liu ....................... H04L 49/602 370/338
2022/0321499 A1 * 10/2022 DiFerdinando ......... H04L 45/66

* cited by examiner

*Primary Examiner* — Nam V Nguyen
(74) *Attorney, Agent, or Firm* — K& L Gates LLP

(57) ABSTRACT

Devices and techniques are generally described for an access control mesh network. In various examples, a first access control peripheral may establish communication using a first communication modality, at a first time, with first access control hardware. The first access control peripheral may determine at a second time, that the communication with the first access control hardware using the first communication modality is unavailable. In some further examples, the first access control peripheral may establish communication with second access control hardware. In some examples, the communication with the second access control hardware may be established using a second communication modality.

20 Claims, 7 Drawing Sheets

302

| Connectivity Channels | Availble Hardware Boards | | | |
|---|---|---|---|---|
| | Access Control Hardware Board-1 | Access Control Hardware Board-2 | Access Control Hardware Board-3 | Access Control Hardware Board-4 |
| Wired | Priority-1 | Priority-2 | Priority-3 | Priority-4 |
| Wi-Fi | Priority-5 | Priority-6 | Priority-7 | Priority-8 |
| Bluetooth | Priority-9 | Priority-10 | Priority-11 | Priority-12 |
| Private Cellular 5G | Priority-13 | Priority-14 | Priority-15 | Priority-16 |
| Peer to Peer Connection | Priority-17 | Priority-18 | Priority-19 | Priority-20 |

FIG. 3A

304

| Connectivity Channels | Availble Hardware Boards | | | |
|---|---|---|---|---|
| | Access Control Hardware Board-1 | Access Control Hardware Board-2 | Access Control Hardware Board-3 | Access Control Hardware Board-4 |
| Wired | Priority-1 | Priority-6 | Priority-11 | Priority-16 |
| Wi-Fi | Priority-2 | Priority-7 | Priority-12 | Priority-17 |
| Bluetooth | Priority-3 | Priority-8 | Priority-13 | Priority-18 |
| Private Cellular 5G | Priority-4 | Priority-9 | Priority-14 | Priority-19 |
| Peer to Peer Connection | Priority-5 | Priority-10 | Priority-15 | Priority-20 |

FIG. 3B

ACCESS CONTROL MESH NETWORK

BACKGROUND

Access control, in the context of physical security, refers to controlling access to one or more controlled areas. Access control circuitry and/or hardware (sometimes called access control "boards") include various components enabling them to read and process information from various peripheral devices, such as keypads, card readers, alarm systems, biometric scanners, etc. When a user attempts to gain access to a secure location or system, the access control board may verify their identity using the data received by an input peripheral device (e.g., from a scanned access card, scanned biometric data, etc.) and any relevant data stored in a database or system related to the user's input. The user's access to the secure location or system may be conditioned upon the user having the appropriate permissions, as determined using the access control system.

BRIEF DESCRIPTION OF DRAWINGS

FIG. 3A illustrates an example routing logic table for providing failover protection in a access control mesh system, in accordance with various aspects of the present disclosure.

FIG. 3B illustrates a different example routing logic table for providing failover protection in a access control mesh system, in accordance with various aspects of the present disclosure.

DETAILED DESCRIPTION

Figure 1:
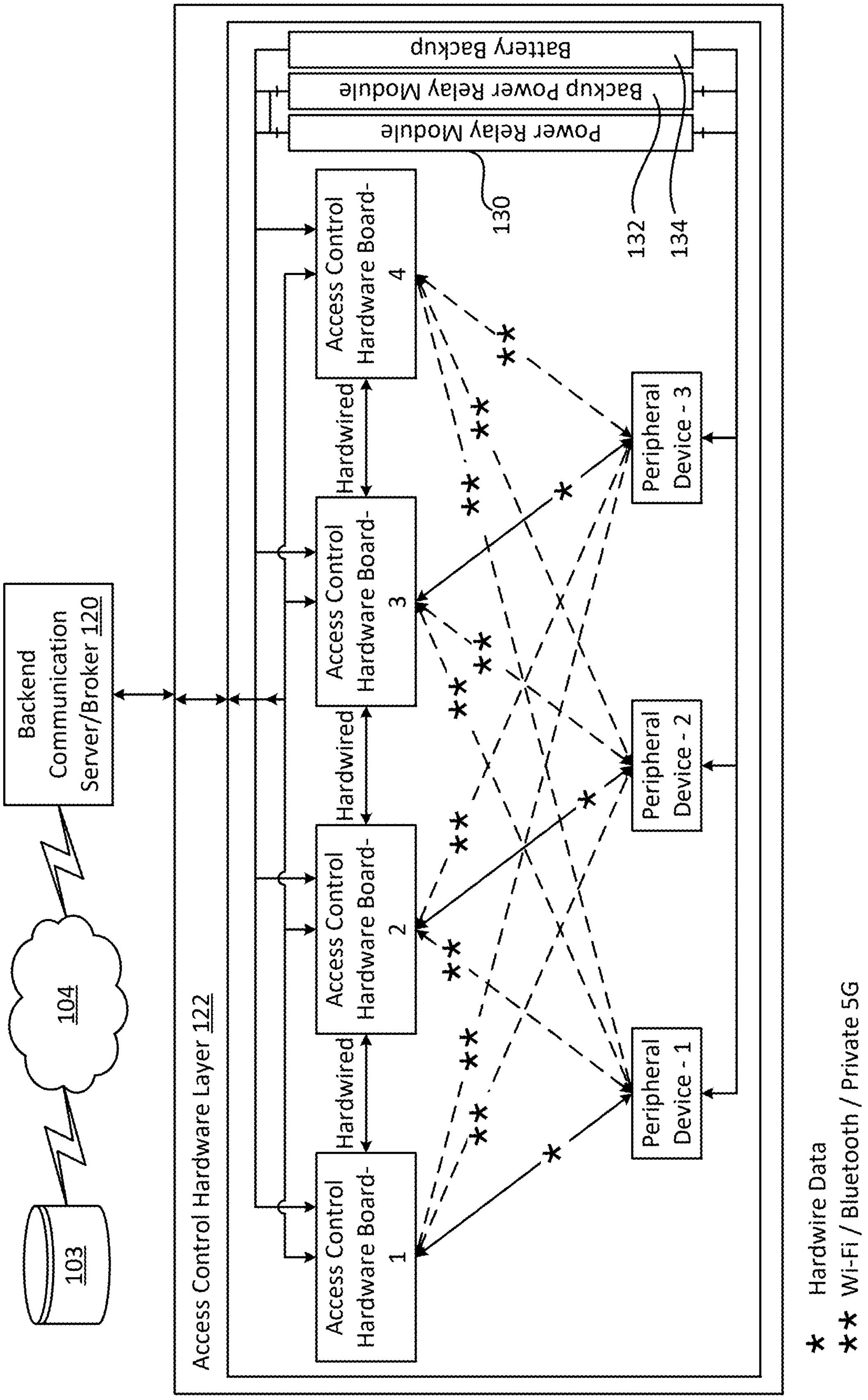
FIG. 1 is a diagram of an example access control mesh providing failover protection, according to various embodiments of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

An "access control board" or "access control hardware" as used herein, refers to any circuitry and/or hardware configured to control access to a physical location and/or a digital system or network. In various examples, access control boards may be configured in communication with peripheral devices (e.g., "access control peripheral devices") such as such as keypads, card readers, alarm systems, biometric scanners, sensors, etc. In various examples, a user may provide access information (e.g., a unique code associated with an employee or other user) to an access control board using an access control peripheral device. For example, the user may scan a card that encodes the access information at a card reader (e.g., using Near Field Communication (NFC)) or may otherwise provide an access code (e.g., via a keypad). The card reader may be an example of a peripheral device that is configured in communication with an access control board. The card reader, in this example, may be any desired type of reader or scanner (e.g., an infrared one-dimensional or matrix barcode scanner, a magnetic strip (Magstrip) reader, a radio frequency identification (RFID) reader, etc.). In other examples, instead of using a card reader, another scanner type may be used as an access control peripheral. A non-exhaustive list of non-card reader examples of peripheral devices may include a biometric scanner (e.g., a fingerprint scanner, face scanner, retinal scanner, etc.), a keypad (in which the user directly enters their access code), etc.

The access control information (data) may be read and/or determined. For example, if a card is scanned, an access code encoded on the card may be read by the peripheral card reader. The peripheral card reader may send the code to the access control board. The access control board may use the access code to perform a lookup in the database. The access code may be associated with one or more different access privilege levels in the database. For example, the privilege levels may define which controlled access zones the user (e.g., the user associated with the access card) is authorized to enter (and/or at what times the user is authorized to enter). The peripheral card reader may be associated with a particular controlled access zone (e.g., with a particular security door). If the access code read from the card is privileged to access that controlled access zone at the current time, a signal may be sent from the access control board to unlock the door (e.g., by sending a signal to an electronic strike plate or other electronically-controlled lock associated with the door and/or controlled access zone). In various examples, the electronically-controlled lock may automatically re-lock after a predetermined amount of time to prevent unauthorized access to the controlled area. Conversely, if the access code read from the card is not privileged to enter the controlled access zone, the door may remain locked and, in some cases, the access control board may trigger an alert and/or alarm. While the foregoing example uses a card reader as the access control peripheral device and a card with a stored access code, access control boards may instead use biometric scanners as peripherals, where biometric information is provided from the scanner to the access control board and the access control board consults a database entry associated with the individual to determine whether the individual is privileged to enter the controlled area.

Peripheral devices (e.g., access control peripherals) are typically configured in wired communication with access control boards. In various examples, multiple peripheral devices (e.g., alarms, card readers, scanners, cameras, key pads, etc.) may be configured in wired communication with an access control board. Wired communication is typically used because access control peripherals typically receive power from the access control boards and because wired communication may be more reliable than certain forms of wireless communication.

However, access control boards are prone to failures where the entire board fails (e.g., a power supply failure) and/or where some module of the access control board fails. When this occurs, the peripheral devices that communicate with that board (e.g., with that access control hardware) may be unable to communicate with the board and may therefore be unable to perform their intended functions. In this context, a peripheral device being unable to communicate with a board may indicate that no connection may be established or that a connection is established but that the operations requested by the peripheral device are unable to be performed for some reason. In some cases, the peripheral devices and/or access control boards may lose power or may malfunction, while in others they may simply be unable to communicate with the access control board (depending on the type of failure). This is a significant problem, particularly for providing consistent access control to a high-availability secure environment (e.g., where access is needed at any given hour of the day). This can lead to safety issues and/or dangerous conditions in certain contexts such as when individuals are unable to pass through a secured doorway due to the hardware failure and/or where access control is disabled due to the hardware failure (potentially allowing access to unauthorized individuals). In an example, highly-secure drone-based delivery sites are required to implement strict access control measures in order to keep such sites secure and prevent unauthorized individuals from entry. In addition to potentially serious safety concerns, large fines may be imposed by regulatory agencies upon detection of unauthorized individuals. Accordingly, it is important to have failure protection for access control in such facilities. Unfortunately, current systems are unable to seamlessly provide access control in the event of certain hardware failure events (as described above).

Accordingly, described herein in an access control mesh network that may be used to provide consistent, robust, high-availability access control even in the face of failure of one or more access control boards. The access control mesh networks described herein offer failover redundancy, where if one access control board fails, the relevant access control peripheral devices automatically connect to another available access control hardware board. Additionally, the access control mesh networks described herein offer custom routing logic, in which access control peripheral devices attempt to connect to different access control boards in specified orders using different communication modalities. Generally, when failover equipment is provided for access control, the extra failover hardware equipment is in a standby condition and is employed only upon failure. However, in the various examples described herein, a plurality of network of access control boards and access control peripheral devices are provided that operate in a mesh architecture to provide continuous connectivity and access control even in the event of device failure.

FIG. 1 is a diagram of an example access control mesh providing failover protection, according to various embodiments of the present disclosure. As depicted in FIG. 1, one or more computing device(s) may implement a backend communication server and/or message broker (e.g., backend communication server/broker 120) that may communication with one or more non-transitory computer-readable memories 103, such as over a network 104. In some examples, non-transitory computer-readable memory 103 may store instructions that, when executed by at least one processor of the access control hardware boards, the access control peripherals, and/or the backend communication server/broker 120, may be effective to perform one or more of the various techniques described herein. In various examples, network 104 may represent a local area network (LAN) and/or a wide area network (WAN) such as the internet. The backend communication server/broker 120 may be used for communication between the access control hardware layer 122 and one or more other systems (e.g., for sending alerts, log data, updates, video data, etc.).

In the example access control mesh depicted in FIG. 1, access control hardware layer 122 includes four access control hardware boards (e.g., Access Control Hardware Board 1, Access Control Hardware Board 2, Access Control Hardware Board 3, and Access Control Hardware Board 4) and three access control peripheral devices (e.g., Peripheral Device 1, Peripheral Device 2, and Peripheral Device 3). It should be noted that any number of access control hardware boards and/or access control peripheral devices may be used in accordance with the desired implementation. Thus the example access control mesh shown in FIG. 1 is not intended to limit the scope of the various embodiments described herein to any specific number of devices.

In the example implementation in FIG. 1, each access control peripheral device is hardwired to a single access control hardware board (e.g., for hardwired data communication). However, the access control peripheral devices may be hardwired to multiple access control hardware boards, as desired. For example, in FIG. 1, access control peripheral device 1 is hardwired only to access control hardware board 1, while access control peripheral device 2 is hardwired only to access control hardware board 2, and so on. Additionally, in the example of FIG. 1, all of the access control hardware boards are wired to each other (e.g., in parallel). In addition to having a hardwire connection to different access control hardware boards, the different access control peripheral devices (and the access control hardware boards) depicted in FIG. 1 may be enabled with other communication functionality. For example, as described below, the different access control peripheral devices and access control hardware boards may include Wi-Fi communication interfaces, Bluetooth transmitters/receivers, cellular transmitters/receivers, etc. Additionally, although in FIG. 1, access control peripheral device 1 is shown only with a hardwire connection to access control hardware board 1 (to reduce visual clutter), it should be noted that access control peripheral device 1 may be able to communicate with access control hardware board 1 via Wi-Fi, Bluetooth (or other short-range wireless communication protocols), cellular (e.g., private 5G), etc. Similarly, peripheral device 2, although shown only with a hardwire connection to access control hardware board 2, may also communicate with access control hardware board 2 via Wi-Fi, short-range communication protocols, cellular communication, etc. Access control peripheral device 3 may also communicate using any desired protocol with the different access control hardware boards (e.g., Wi-Fi, short-range communication protocols, cellular communication, etc.).

In various examples, a given access control peripheral device may establish communication with an access control hardware board to which it is wired in a default state. Additionally, a given access control peripheral device may establish wireless communication with an access control hardware board. For example, access control peripheral device 1, which is hardwired to access control hardware board 1 may communicate with access control hardware board 1 via the hardwired connection to perform its function (e.g., access control to a secured area). Each of the access control hardware boards may store a database that provides the respective privilege levels associated with each different access code. Accordingly, when an access control hardware board (e.g., access control hardware board 1) receives an access code from a peripheral device (e.g., when access control hardware board 1 receives an access code from a card scan captured by peripheral device 1), the access control board may perform a lookup to determine if the received access code is permitted to access the relevant area/system. If so, a control signal may be sent from the access control hardware board to the relevant access control system (e.g., an electronic strike plate associated with a secured door that is, in turn, associated with the relevant peripheral device (e.g., peripheral device 1). The database that associates access codes with different privilege levels may be maintained by the backend communication server/broker 120. Accordingly, the backend communication server/broker 120 may update the database and may send any updates to the access control hardware boards (e.g., when privilege levels are updated and/or when users are added/removed from the system).

In the event of the failure of an access control hardware board, a peripheral device that is in communication with that access control hardware board may establish communication with a different access control hardware board either via wired or wireless communication (according to the specific routing logic that is implemented). For example, peripheral device 1 may be in hardwired communication with access control hardware board 1. However, access control hardware board 1 may experience a failure and may be unable to function and/or communicate with any other components. As described herein, peripheral device 1, upon being unable to communicate with the access control hardware board 1, may establish communication with another access control hardware board according to customizable routing logic. The customizable routing logic may cause access control peripherals to attempt to communicate with different access control boards in a specific order and/or using specific communication modalities. The specific order in which the peripheral device 1 attempts to connect with the other access control hardware boards and the order in which specific communication modalities are used to attempt to access the other access control hardware boards is customizable, as described in further detail below.

In an example, upon being unable to communicate with access control hardware board 1, peripheral device 1 may attempt a hardwired connection with each other access control hardware board. However, as shown in FIG. 1, in this example, the peripheral device 1 is only hardwired to access control board 1. Accordingly, peripheral device 1 is unable to establish a hardwired connection with any other access control board. As such, peripheral device 1 may attempt to connect to the access control hardware boards using a different communication modality (e.g., an IEEE 802.11 communication standard (hereinafter "Wi-Fi")). In an example routing logic, the peripheral device 1 may first attempt to communicate with access control hardware board 1 via Wi-Fi, followed by access control hardware board 2 via Wi-Fi, and so on, until the peripheral device 1 is able to establish communication with one of the access control hardware boards. If peripheral device 1 is unable to establish communication with any of the access control hardware boards via Wi-Fi, peripheral device 1 may attempt a different communication modality, according to the specific customized routing logic being employed. Examples of routing logic are described in further detail below. Examples of different communication modalities that may be used for communication between access control peripheral devices and the access control hardware boards may include hardwired connection (e.g., Ethernet, co-axial cabling, and/or other data communication cables/circuits), Wi-Fi, short-range wireless communication protocols (e.g., such as Bluetooth®, Bluetooth Low Energy (BTLE) Zigbee, etc.), cellular (e.g., a private 5G network, LTE network, etc.), peer-to-peer connection, and/or any other desired communication protocol. As used herein, short-range wireless communication refers to communication over relatively short distances such as within 10 meters, 20 meters, or some other distance.

Note that in the example of FIG. 1, each access control hardware board may be functioning simultaneously to provide access control and may be nominally communicating with their own respective peripheral devices at any given time (e.g., pre-failure). However, when an access control board fails, the peripheral devices that are in nominal communication with the failed board may establish communication with another access control hardware board according to a custom routing logic due to the mesh topology of the access control hardware layer 122.

In addition, in many traditional access control systems, the access control hardware board provides power to the peripheral devices. Accordingly, in such an architecture, if an access control hardware board fails, all the peripheral devices to which the failed board is connected will also cease functioning. By contrast, in the access control hardware layer 122, power is provided via a separate power relay module 130. Thus, the failure of any given access control hardware board and/or access control peripheral device does not cause any other device to lose power. Additional redundancy is also provided by backup power relay module 132 such that, in the event that power relay module 130 fails, power may be provided to each access control hardware board and each peripheral device via the backup power relay module 132. Further redundancy may be provided by a battery backup 134 so that even if both the power relay module 130 and the backup power relay module 132 fail, power may be maintained via battery backup 134.

When a given device fails an alert may be generated and sent to the backend communication server/broker 120 so that remedial action may be taken. For example, if access control hardware board 1 fails, another access control hardware board and/or a peripheral device may send an alert to backend communication server/broker 120 indicating that the access control hardware board 1 is offline. Additionally, if power relay module 130 fails and the auxiliary power from backup power relay module 132 is employed, an alert may be sent to backend communication server/broker 120. Similarly, if battery backup 134 is used an alert may be sent to backend communication server/broker 120 so that the power condition may be remedied.

Similarly, other log events may be provided by the peripheral devices and/or the access control hardware boards to the backend communication server/broker 120. For example, if an unauthorized user attempts to access a particular controlled zone (e.g., via a specific peripheral device) an alert may be generated, an alarm condition may occur, a camera feed may be sent to an appropriate security monitor device, etc.

Figure 2:
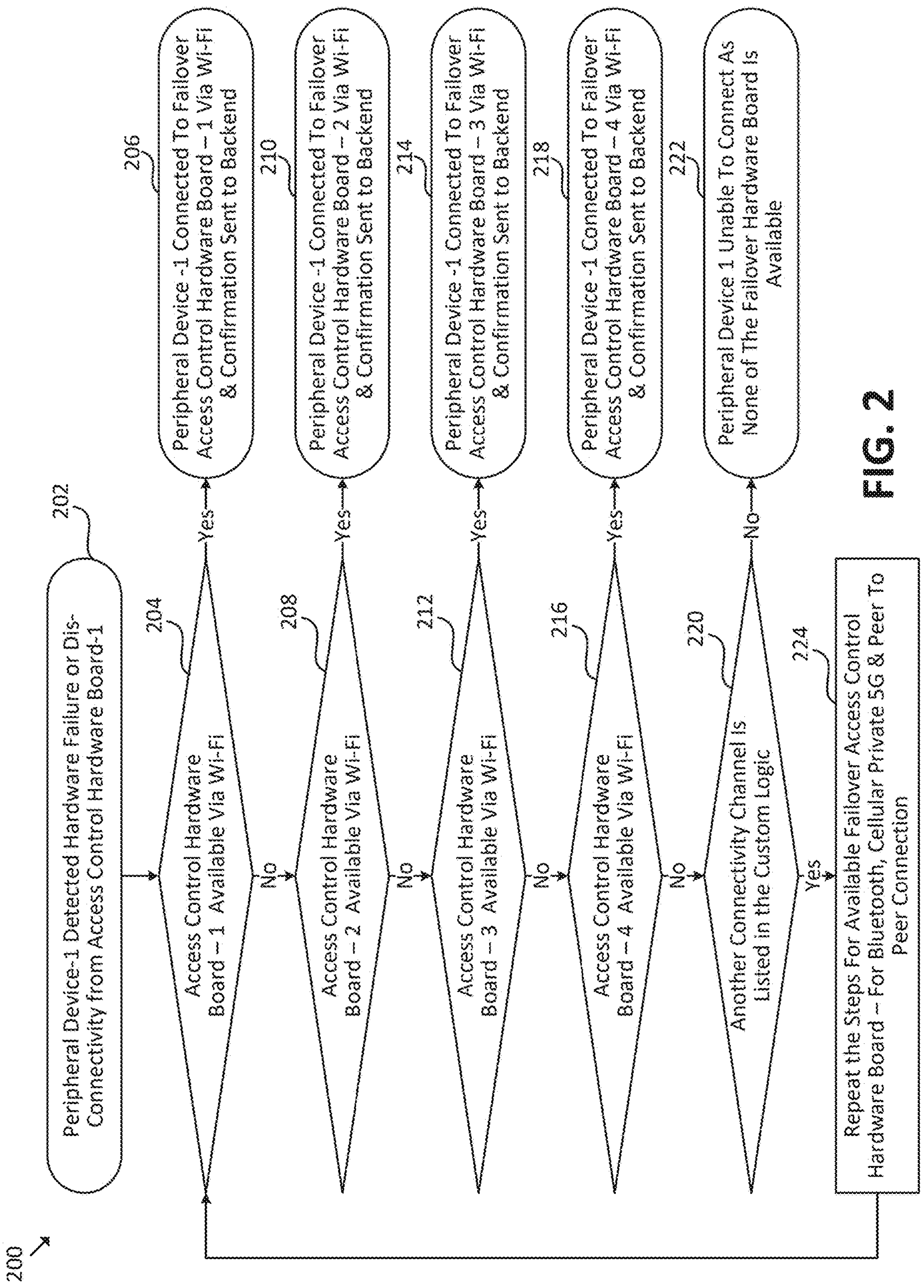
FIG. 2 illustrates an example failover connection flow for an access control mesh system, in accordance with various embodiments of the present disclosure.

FIG. 2 depicts a flow chart showing an example failover connection process 200 for an access control mesh system, according to various aspects of the present disclosure. Those portions of FIG. 2 that have been previously discussed in reference to FIG. 1 may not be described again for purposes of clarity and brevity. The actions of the process 200 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 200 may begin at action 202, at which peripheral device 1 may detect a hardware failure and/or dis-connectivity from access control hardware board 1. For example, peripheral device 1 may be hardwired to the access control hardware board 1. Some component of access control hardware board 1 may have failed and may not be able to communicate via the hardwired connection. In the example failover access control hardware connection flow of FIG. 2, processing may continue at action 204, at which a determination may be made, by the peripheral device 1, whether access control hardware board 1 is available (e.g., whether communication may be established) via Wi-Fi communication.

If communication may be established with the access control hardware board 1 via Wi-Fi, processing may continue at action 206, at which peripheral device 1 may connect to the access control hardware board 1 using the failover logic via Wi-Fi. Confirmation of the connection may be sent to backend communication server/broker 120. Conversely, if communication cannot be established with access control board 1 via Wi-Fi, processing may continue at action 208, at which a determination may be made, by the peripheral device 1, whether access control hardware board 2 is available (e.g., whether communication may be established) via Wi-Fi.

If communication may be established with the access control hardware board 2 via Wi-Fi, processing may continue at action 210, at which peripheral device 1 may connect to the access control hardware board 2 using the failover logic via Wi-Fi. Confirmation of the connection may be sent to backend communication server/broker 120. Conversely, if communication cannot be established with access control board 2 via Wi-Fi, processing may continue at action 212, at which a determination may be made, by the peripheral device 1, whether access control hardware board 3 is available (e.g., whether communication may be established) via Wi-Fi.

If communication may be established with the access control hardware board 3 via Wi-Fi, processing may continue at action 214, at which peripheral device 1 may connect to the access control hardware board 3 using the failover logic via Wi-Fi. Confirmation of the connection may be sent to backend communication server/broker 120. Conversely, if communication cannot be established with access control board 3 via Wi-Fi, processing may continue at action 216, at which a determination may be made, by the peripheral device 1, whether access control hardware board 4 is available (e.g., whether communication may be established) via Wi-Fi.

If communication may be established with the access control hardware board 4 via Wi-Fi, processing may continue at action 218, at which peripheral device 1 may connect to the access control hardware board 4 using the failover logic via Wi-Fi. Confirmation of the connection may be sent to backend communication server/broker 120. Conversely, if communication cannot be established with access control board 4 via Wi-Fi, processing may continue at action 220, at which a determination may be made whether another custom connectivity channel (e.g., communication modality) is listed in the custom failover logic. The custom failover logic may be stored by each peripheral device in memory. If not, processing may continue to action 222 at which peripheral device 1 may be unable to connect as none of the failover access control hardware boards may be available. An alert may be generated and sent to the backend communication server/broker 120 to inform the backend communication server/broker 120 that the peripheral device 1 is offline and/or non-functional.

Conversely, if there is another connectivity channel listed in the custom failover logic (e.g., another communication modality), processing may continue at action 224, at which the peripheral device 1 may repeat the steps (returning to action 204), but with the connectivity channel/communication modality listed as the next-highest priority in the custom failover logic. For example, the processing steps 204-220 may be repeated with Bluetooth®, Cellular, peer-to-peer, etc. Examples of custom failover logic in an example routing logic table 302 is shown in FIG. 3A.

Example routing logic table 302 depicts different priority levels for connection between a peripheral device and various access control hardware boards (e.g., Access control hardware boards 1, 2, 3, and 4 in the example in FIG. 3A). Although this table provides custom failover logic for four access control hardware boards, any number of access control hardware boards may instead be used in accordance with the desired implementation. Additionally, in the example routing logic table 302, there are five communication modalities: wired, Wi-Fi, Bluetooth®, Private cellular 5G, and peer-to-peer connection. It should be noted that additional, fewer, or different communication modalities apart from those specifically shown may be used in accordance with the desired implementation.

A routing logic table 302 may be stored in memory by each peripheral device such that the peripheral device may determine the appropriate order and communication modality to use to attempt to connect to another access control hardware board when communication with a current access control hardware board is unavailable.

In the example of FIG. 3A, the peripheral device may attempt each connection in ascending order of priority (with lowest priority scores being the highest priority connections). For example, the peripheral device storing the routing logic table 302 may first attempt wired communication with access control hardware board 1 (Priority 1). If this is unsuccessful, the peripheral device may attempt wired communication with access control hardware board 2, and so on. If no wired connections are available, the peripheral device may next attempt Wi-Fi connection with access control hardware board 1 (Priority 5), followed by an attempt at Wi-Fi connection with access control hardware board 2 (Priority 6), and so on. In various examples, the routing logic table 302 may be sent (e.g., via an access control hardware board) to the various peripheral devices and/or may be updated and/or modified over time according to the desired custom routing logic.

FIG. 3B illustrates a different example routing logic table 304 for providing failover protection in a access control mesh system, in accordance with various aspects of the present disclosure. As shown in this example routing logic, an access control peripheral, when unable to establish communication with a given access control hardware board (e.g., access control hardware board 1) may attempt a variety of other communication modalities (in an order specified by the routing logic) for communication with that access control hardware board before attempting to communicate with another access control hardware board. In general, the specific failover routing logic may be customized according to the desired implementation. Accordingly, the example routing logic tables 302, 304 are merely two possible example implementations.

In some examples, when an access control peripheral device has lost communication with a given access control hardware board and uses failover logic (e.g., the logic expressed in the example routing logic tables 302, 304) to connect to a different access control board, the access control peripheral may periodically (e.g., after a threshold amount of time has passed since the access control peripheral was unable to connect) attempt to connect to the access control hardware board with which communication was lost (e.g., for purposes of balancing the peripheral load over the different access control boards).

Figure 4:
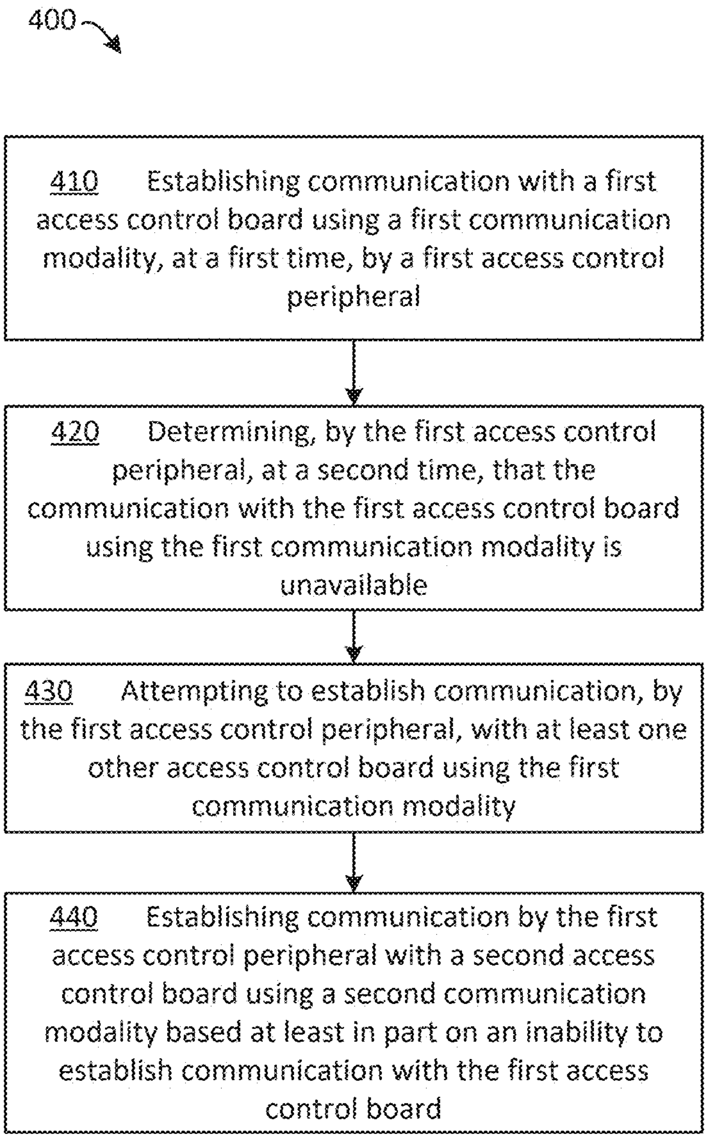
FIG. 4 illustrates another example failover connection flow for an access control mesh system, in accordance with various embodiments of the present disclosure.

FIG. 4 depicts a flow chart showing an example failover connection process 400 for an access control mesh system, according to various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which communication may be established with a first access control board using a first communication modality. The communication may be established at a first time, by a first access control peripheral. For example, the first communication modality may be a hardwired connection, Wi-Fi, or any other desired communication modality.

Processing may continue at action 420, at which a determination may be made, by the first access control peripheral at a second time, that the communication with the first access control board using the first communication modality is unavailable. For example, the first access control board may have a failure, a communication cable may have been severed or disconnected, etc. The first access control peripheral may no longer be able to communicate with the first access control board at the second time.

Processing may continue at action 430, at which the first access control peripheral may attempt to establish communication with at least one other access control board using the first communication modality. For example, the first access control peripheral may attempt to establish communication with a second access control board using the first communication modality.

Processing may continue at action 440, at which communication may be established by the first access control peripheral with a second access control board using a second communication modality based at least in part on an inability to establish communication with the first access control board. For example, the first access control peripheral may attempt to establish communication with the first access control board using the second communication modality and may be unable to establish communication in that manner. Accordingly, the first access control peripheral may attempt to establish communication with the second access control board using the second communication modality, which may be successful. The first access control peripheral may send data describing its various connection attempts (successful and unsuccessful) to the backend communication server/broker 120 so that appropriate remedial action may be taken.

Figure 5:
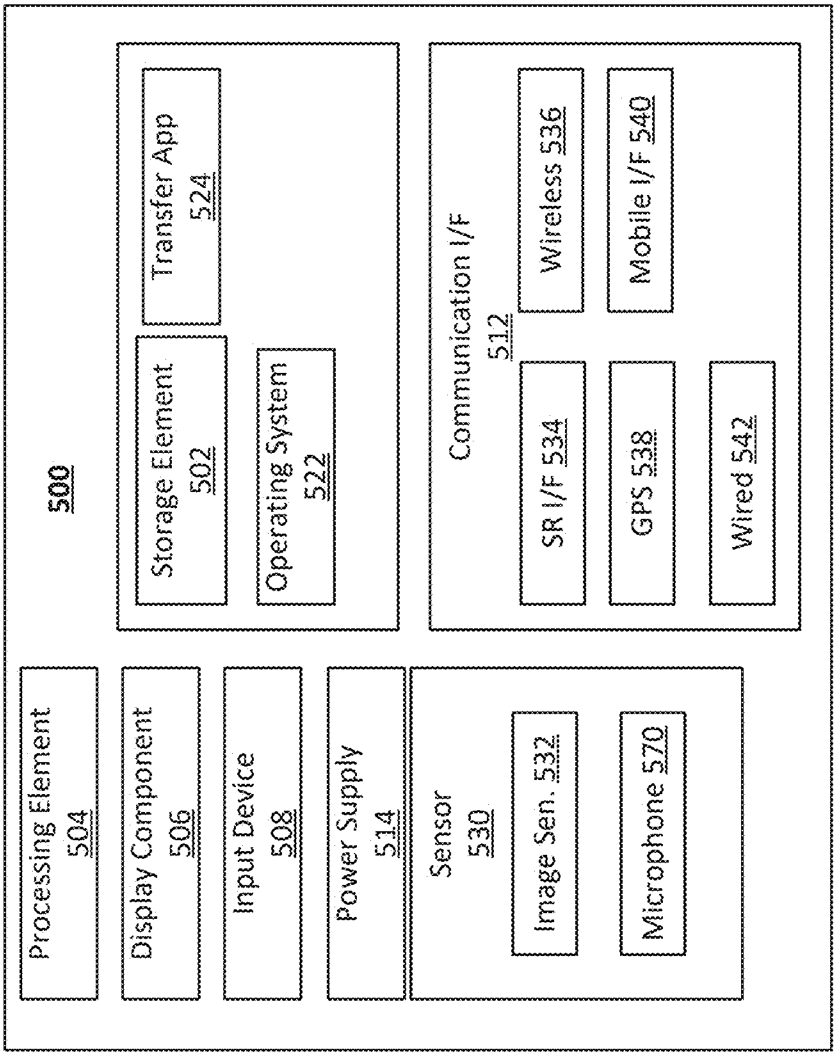
FIG. 5 is a block diagrams showing an example architecture of a computing device that may be used in accordance with various embodiments described herein.

FIG. 5 is a block diagram showing an example architecture 500 of a computing device that may be used in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or footprint segmentation masks generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short-range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the architecture 500, as described herein, are exemplary, and may be located as a stand-alone device or may be included, in whole or in part, as a component of a larger device or system.

Figure 6:
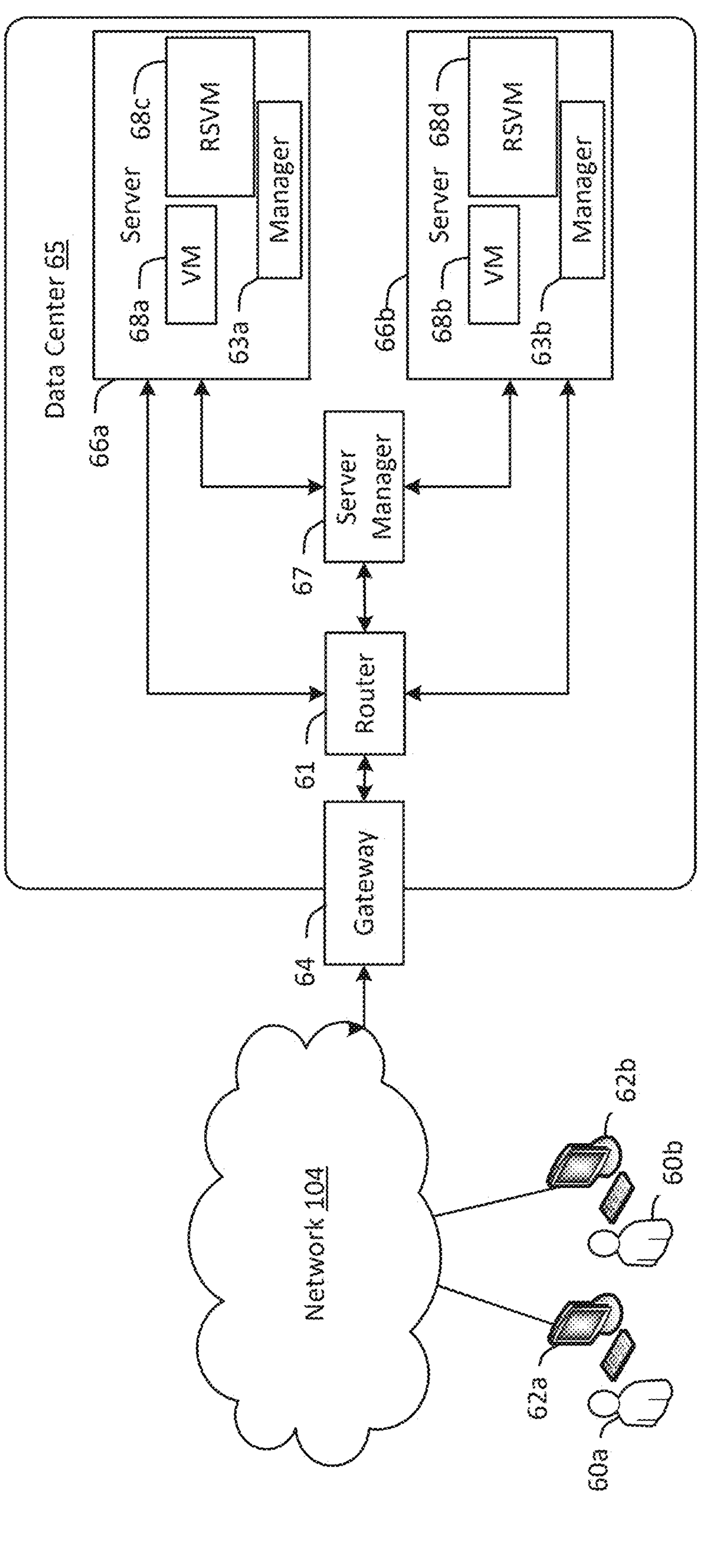
FIG. 6 is a diagram illustrating an example system for sending and providing data that may be used in accordance with the present disclosure.

An example system for sending and providing data that may be used to implement all or some portions of an access control mesh network are described in reference to FIG. 6. In particular, FIG. 6 illustrates an example computing environment in which the embodiments described herein may be implemented. For example, the computing environment of FIG. 6 may be configured to perform catalog computer-vision based hazard detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute the custom failover logic described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP), non-HTTP protocols, REST API-based protocols, etc. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an c-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

establishing hardwired data communication, at a first time, by a first access control peripheral with a first access control board;

determining, by the first access control peripheral at a second time, that hardwired communication with the first access control board is unavailable;

determining, by the first access control peripheral, first access control routing logic;

determining, by the first access control peripheral based on the first access control routing logic, that 802.11 wireless communication with the first access control board is unavailable;

determining, by the first access control peripheral, that 802.11 wireless communication with a second access control board is unavailable, wherein the first access control routing logic causes the first access control peripheral to attempt to establish 802.11 wireless communication with the second access control board based on the 802.11 wireless communication with the first access control board being unavailable;

determining, by the first access control peripheral, that short-range wireless communication with the first access control board is unavailable, wherein the first access control routing logic causes the first access control peripheral to attempt to establish the short-range wireless communication with the first access control board based on the 802.11 wireless communication with the first access control board and the second access control board being unavailable; and establishing, by the first access control peripheral, short-range wireless communication with the second access control board, wherein the first access control routing logic causes the first access control peripheral to attempt to establish the short-range wireless communication with the second access control board based on the 802.11 wireless communication with the first access control board and the second access control board being unavailable and based on the short-range wireless communication with the first access control board being unavailable.

2. The method of claim 1, further comprising:

receiving power by the first access control board, the second access control board, and the first access control peripheral from a first power supply, wherein the first power supply is a separate device with respect to the first access control board, the second access control board, and the first access control peripheral.

3. The method of claim 1, further comprising:

storing, by the first access control board, a first database, wherein the first database includes access information used to control access to a first secured area associated with the first access control peripheral; and sending the first database to the second access control board.

4. A method comprising:

establishing communication using a first communication modality, at a first time, by a first access control peripheral with first access control hardware;

determining, by the first access control peripheral at a second time, that the communication with the first access control hardware using the first communication modality is unavailable;

determining, by the first access control peripheral based on the communication with the first access control hardware being unavailable via the first communication modality, first routing logic stored in non-transitory computer-readable memory of the first access control peripheral; and establishing communication by the first access control peripheral with second access control hardware based on the communication with the first access control hardware being unavailable via the first communication modality, wherein the first access control peripheral establishes the communication with the second access control hardware according to the first routing logic.

5. The method of claim 4, further comprising:

determining, by the first access control peripheral, that communication with the second access control hardware using the first communication modality is unavailable, wherein the first routing logic causes the first access control peripheral to attempt to establish communication with the second access control hardware using the first communication modality based on the communication with the first access control hardware using the first communication modality being unavailable.

6. The method of claim 5, further comprising:

determining, by the first access control peripheral according to the first routing logic, that communication with the first access control hardware using a second communication modality is unavailable, wherein the second communication modality is different from the first communication modality.

7. The method of claim 4, further comprising:

establishing the communication by the first access control peripheral with the second access control hardware using a second communication modality based at least in part on communication with the first access control hardware and the second access control hardware being unavailable using the first communication modality and based at least in part on communication with the first access control hardware using the second communication modality being unavailable.

8. The method of claim 4, further comprising:

attempting, by the first access control peripheral according to first routing logic, to establish communication with each access control hardware of a plurality of access control boards using the first communication modality, wherein the plurality of access control boards comprises the first access control hardware and the second access control hardware.

9. The method of claim 8, further comprising:

determining, by the first access control peripheral, that communication is unable to be established with any of the plurality of access control boards using the first communication modality; and attempting, by the first access control peripheral according to the first routing logic, to establish communication with each access control board of the plurality of access control boards using a second communication modality based at least in part on the determination that communication is unable to be established with any of the plurality of access control boards using the first communication modality.

10. The method of claim 9, wherein the first communication modality comprises a hardwired connection, and the second communication modality comprises an 802.11 wireless connection.

11. The method of claim 9, further comprising:

determining, by the first access control peripheral, that communication is unable to be established with any of the plurality of access control boards using the second communication modality; and attempting, by the first access control peripheral according to the first routing logic, to establish communication with each access control board of the plurality of access control boards using a third communication modality based at least in part on the determination that communication is unable to be established with any of the plurality of access control boards using the first communication modality or the second communication modality.

12. The method of claim 4, further comprising:

receiving power by the first access control hardware, the second access control hardware, and the first access control peripheral from a first power supply, wherein the first power supply is a separate device with respect to the first access control hardware, the second access control hardware, and the first access control peripheral.

13. A system comprising:

at least one processor; and non-transitory computer-readable memory storing instructions that, when executed by the at least one processor, are effective to:

establish communication using a first communication modality, at a first time, by a first access control peripheral with first access control hardware;

determine, by the first access control peripheral at a second time, that the communication with the first access control hardware using the first communication modality is unavailable;

determine, by the first access control peripheral based on the communication with the first access control hardware being unavailable via the first communication modality, first routing logic stored in non-transitory computer-readable memory of the first access control peripheral; and establish communication by the first access control peripheral with second access control hardware based on the communication with the first access control hardware being unavailable via the first communication modality, wherein the first access control peripheral establishes the communication with the second access control hardware according to the first routing logic.

14. The system of claim 13 the non-transitory computer-readable memory storing further instructions that, when executed by the at least one processor, are further effective to:

determine, by the first access control peripheral, that communication with the second access control hardware using the first communication modality is unavailable, wherein the first routing logic causes the first access control peripheral to attempt to establish communication with the second access control hardware using the first communication modality based on the communication with the first access control hardware using the first communication modality being unavailable.

15. The system of claim 14, the non-transitory computer-readable memory storing further instructions that, when executed by the at least one processor, are further effective to:

determine, by the first access control peripheral according to the first routing logic, that communication with the first access control hardware using a second communication modality is unavailable, wherein the second communication modality is different from the first communication modality.

16. The system of claim 13, the non-transitory computer-readable memory storing further instructions that, when executed by the at least one processor, are further effective to:

establish the communication by the first access control peripheral with the second access control hardware using a second communication modality based at least in part on communication with the first access control hardware and the second access control hardware being unavailable using the first communication modality and based at least in part on communication with the first access control hardware using the second communication modality being unavailable.

17. The system of claim 13, the non-transitory computer-readable memory storing further instructions that, when executed by the at least one processor, are further effective to:

attempt, by the first access control peripheral according to first routing logic, to establish communication with each access control board of a plurality of access control boards using the first communication modality, wherein the plurality of access control boards comprises the first access control hardware and the second access control hardware.

18. The system of claim 17, the non-transitory computer-readable memory storing further instructions that, when executed by the at least one processor, are further effective to:

determine, by the first access control peripheral, that communication is unable to be established with any of the plurality of access control boards using the first communication modality; and attempt, by the first access control peripheral according to the first routing logic, to establish communication with each access control board of the plurality of access control boards using a second communication modality based at least in part on the determination that communication is unable to be established with any of the plurality of access control boards using the first communication modality.

19. The system of claim 13, the non-transitory computer-readable memory storing further instructions that, when executed by the at least one processor, are further effective to:

receive power by the first access control hardware, the second access control hardware, and the first access control peripheral from a first power supply, wherein the first power supply is a separate device with respect to the first access control hardware, the second access control hardware, and the first access control peripheral.

20. The system of claim 13, the non-transitory computer-readable memory storing further instructions that, when executed by the at least one processor, are further effective to:

cause the first access control peripheral to attempt to establish communication with the first access control hardware after a predetermined amount of time has passed.

* * * * *